912X
Barnum & Brooks.
Alcohol Still.
Patented Jul. 13, 1808.
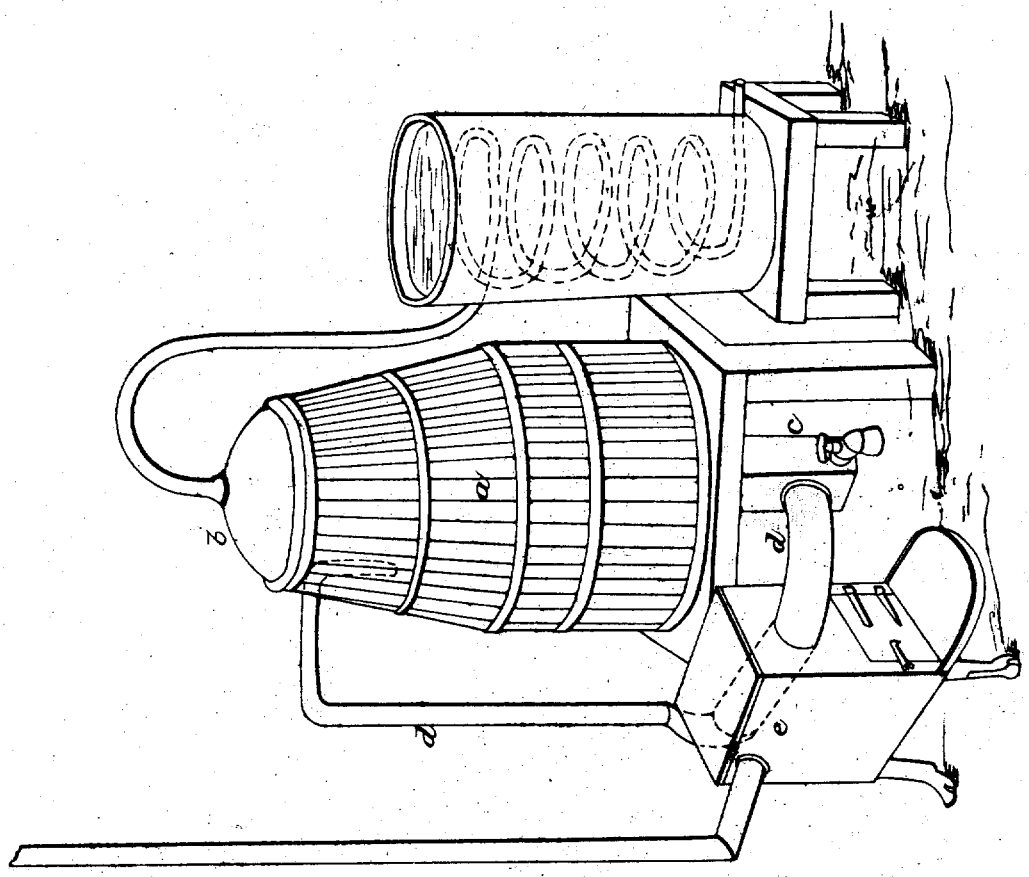
THE ECKERT LITHOGRAPHING CO., WASHINGTON, D. C.

July 13, 1818

9128X Eli Barnum and Benjamin Brooks

Letters Patent. July 13, 1818.

The Schedule referred to in these Letters Patent & making part of the same, containing a Description in the words of the said Eli Barnum & Benjamin Brooks themselves of their Still.

---

A new discovery or improvement of a machine for distilling or boiling water or any kind of liquids. This machine consists of the cylinder, Tube, Cap and Pipe. The cylinder may be made of any kind of wood, and of such size as shall be agreeable to the manufacturer. The cylinder must be gathered from the centre to the upper part, so as not to leave a space across the top of the cylinder exceeding 18 inches. a pewter or copper cap covers over the top of the cylinder & connects with a common copper or pewter worm. A Tube about 12 Inches square projected downwards from the bottom of the cylinder the pipe enters the Tube & passes thro' a flue or oven, then turns upright or vertical until it rises within six inches of the ~~top~~ of the cylinder, then passes into the cylinder: The size of this pipe must vary according to the size of the cylinder. A cylinder containing one hundred gallons, the pipe must be eighteen inches in circumference, that part which rests in the flue. The other parts of the pipe may be reduced to one half of that size above mentioned. This pipe may be made of any kind of metal. At the bottom of the Tube is a brass cock or faucet where the whole contents may be discharged when it is necessary. When the parts described are [illegible] & heated the liquor will circulate with great rapidity through the cylinder and pipe.

Eli Barnum
Benjamin Brooks

Exd. W.C.

Witnesses
Eben. Smith
Josiah Arnold (286 words)

Received August 24. 1837 – Recorded anew.